May 26, 1970     W. L. FIGURA     3,513,925
MOTORIZED GOLF CART

Filed July 18, 1967     3 Sheets-Sheet 1

INVENTOR
WILLIAM L. FIGURA
BY Robert M. Dunning
ATTORNEY

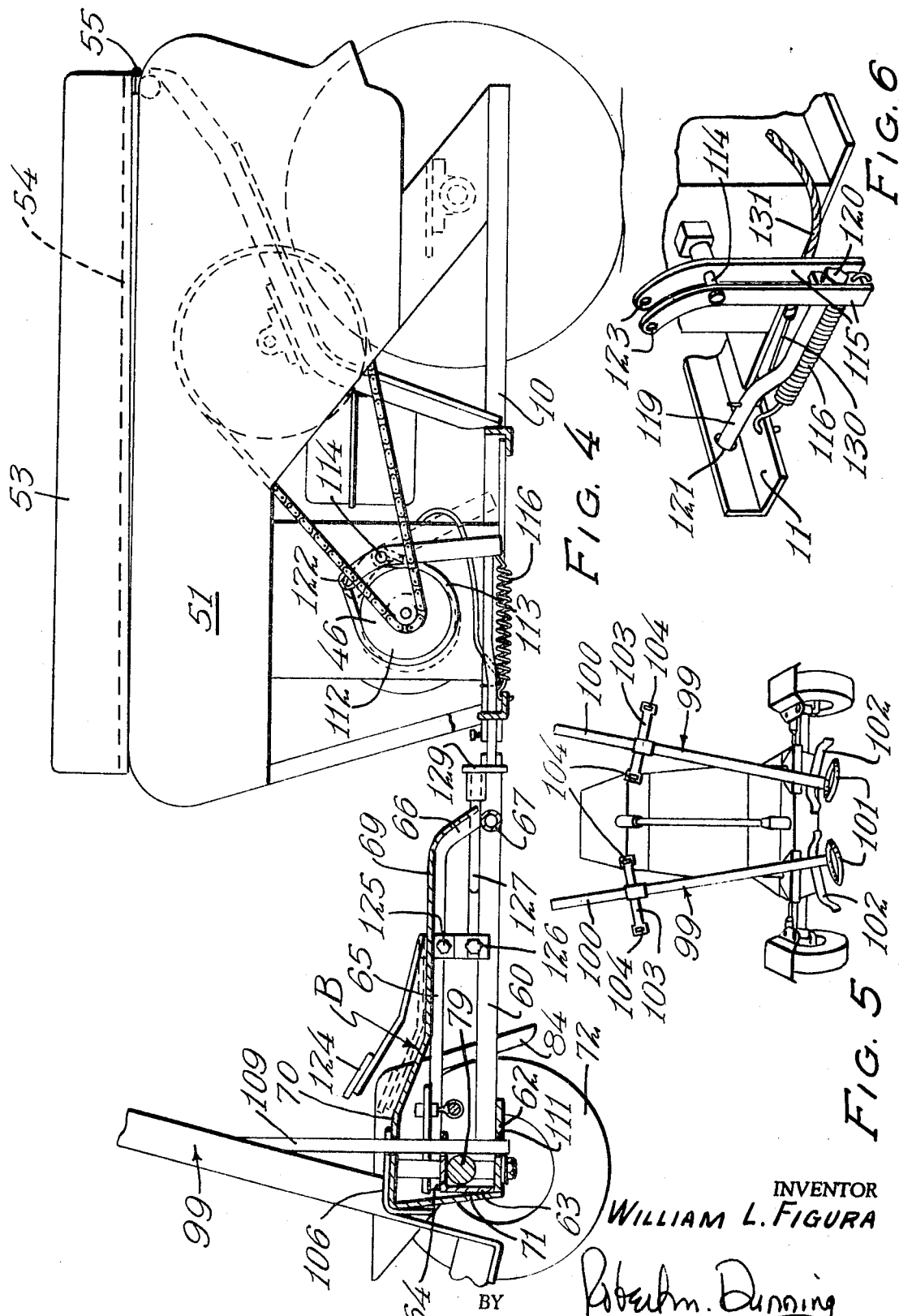

May 26, 1970     W. L. FIGURA     3,513,925
MOTORIZED GOLF CART
Filed July 18, 1967     3 Sheets-Sheet 3
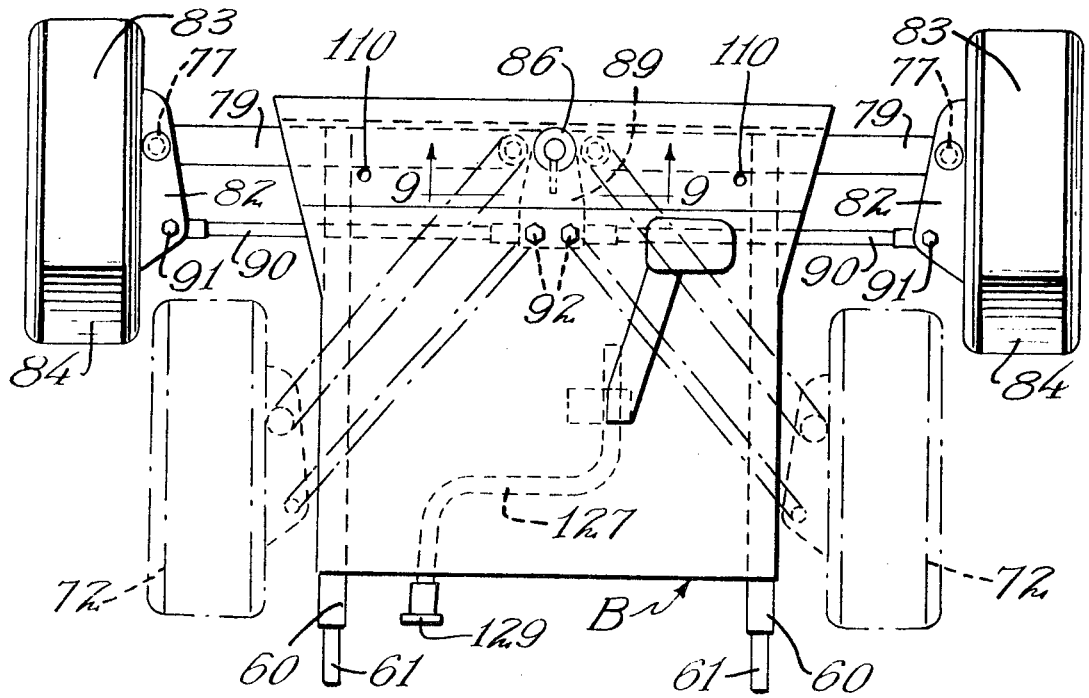
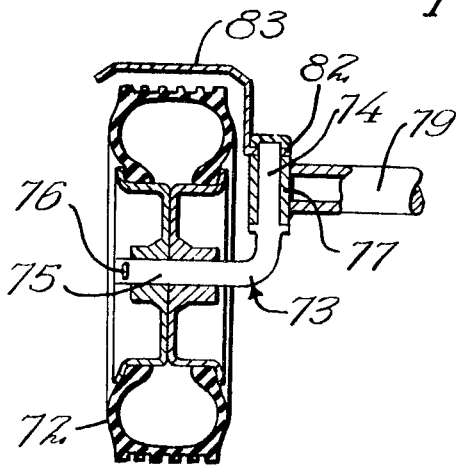
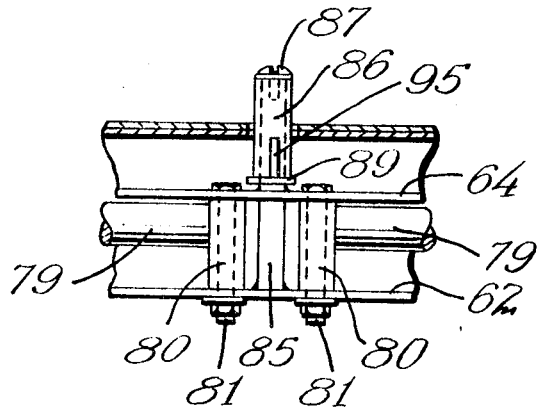
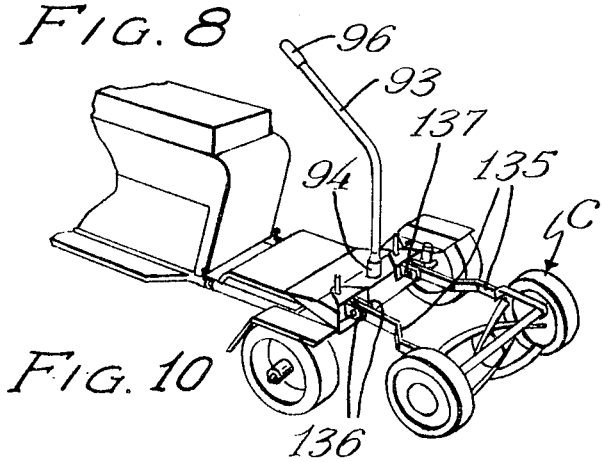
INVENTOR
WILLIAM L. FIGURA
BY Robert M. Dunning
ATTORNEY

United States Patent Office 3,513,925
Patented May 26, 1970

3,513,925
MOTORIZED GOLF CART
William L. Figura, Bruce, Wis. 54819
Filed July 18, 1967, Ser. No. 654,245
Int. Cl. B62d *61/00;* B60k *29/02*
U.S. Cl. 180—25
8 Claims

ABSTRACT OF THE DISCLOSURE

A passenger carrying collapsible motorized golf cart adapted to be separated into front and rear components for carrying and storage. The front wheels are supported extendable to provide unusual stability and are retractable for storage. Means are provided to hold the front wheels in extended position, which means may comprise golf bag supports. A detachable steering handle is provided for steering. A combination brake and clutch operable with the motor throttle is provided for controlling speed and braking. Auxiliary attachments may be attached to front or rear of the cart.

SUMMARY OF THE INVENTION

This invention relates to an improvement in golf cart or similar article and deals particularly with a simple type of cart capable of transporting two people, and which may be partially dismantled and carried in the trunk of an automobile.

The popularity of golf carts on the golf courses has increased considerably during the last few years. One of the difficulties involved on golf courses lies in the fact that a considerable investment is required in the equipment, and in the fact that considerable storage space is required for containing the carts when they are not in use. Furthermore, the purchase of a number of carts for use by golfers also requires that the carts be maintained, as failure of the golf cart to function properly can cause considerable friction between the patrons and the owner of the carts. As a result, the purchase of a considerable number of golf carts by a golf course has its advantages, but also has its material disadvantages.

In view of these facts, many golf courses permit golfers to use their own golf carts when playing the course. Unfortunately, however, most golf carts are quite expensive to purchase, and are actually not economically justafiable unless the owner plays golf at very frequent intervals. Furthermore, most golf carts require a trailer for moving the golf cart from place to place which is also a quite considerable added expense. In view of these facts, the private ownership of golf carts has not greatly increased.

It is an object of the present invention to provide a golf cart which will eliminate most of the disadvantageous features of the private ownership of a golf cart or similar vehicle. The device includes two major parts, one of which comprises an enclosure containing a small gasoline engine, and provided with a cushion on its hinged top closure. This section also supports an extremely wide tread tire and wheel which is connected to the engine for operation thereby. The other main part of the device comprises a removable platform which is detachably connected to the first part of the structure, and which is provided with a pair of laterally spaced wheels and a means of steering the wheels. This section also includes a detachable tiller by means of which the wheels may be steered, and a pair of detachable racks which may be used for supporting bags of golf clubs.

A feature of the present invention resides in a device of the type described which is sufficiently light in weight so that it may be lifted and placed in the trunk of a car in its various parts so that it may be easily carried about from place to place.

A further feature of the present invention resides in the fact that while the front wheels of the device are spaced apart a considerable distance during the use of the cart to stabilize the cart, the wheel supports are so arranged that the wheels may be swung inwardly against the platform at the front of the cart thereby very materially reducing the space required for containing the forward part of the cart.

A further feature of the present invention lies in the fact that the means for holding the wheels in laterally extended position may comprise the bag supports. With this arrangement, when the bag supports are removed, the wheels may swing inwardly into a compact relation to the platform. When the wheels are swung outwardly to their other extreme position, the bag supports may be inserted to lock the wheels in this position. Thus no separate means is required for holding the wheels in laterally extended position during use.

A further feature of the present invention resides in the simplicity with which the apparatus may be assembled and disassembled. When it is desired to convey the cart as, for example, in the trunk of a vehicle, it is only necessary to remove the steering tiller by merely lifting it from the shaft upon which it is telescoped. The golf bag supports may then be removed, releasing the front wheel supports so that they may be swung toward opposite sides of the front platform. By loosening two set screws, or detachable fastening pins, the front and rear sections of the device may be separated. The various parts may then be inserted in the trunk of the car and may be conveniently carried therein in almost any modern-day car except the smallest compact cars which have little or no trunk space.

A further feature of the present invention resides in the simplicity of operation of the cart. The front section of the cart includes a hinged pedal which automatically engages against a control rod incorporated in the rear section of the device. The drive between the vehicle engine and the rear wheel includes a friction clutch and brake element. When the operating pedal is in its normal raised position, a brake band is resiliently held about the clutch, acting as a brake to hold the rear wheel from rotation. As the operating pedal is depressed, the brake band is released, permitting the cart to move. As the brake is released, the throttle of the engine is simultaneously opened so that the cart will move ahead. As soon as the pressure against the operating pedal is released, the throttle of the engine is moved to an idling position, and the brake is automatically applied, holding the cart in a fixed position. Thus the single pedal controls both the throttle and the brake, and automatically stops the cart whenever the pressure upon the operating pedal is released.

While the present device has been primarily designed as a golf cart, its uses are not confined to this extent. For example, a mower reel may be attached forwardly of the cart and the cart may be used to mow the grass. In this event, locking pins may be substituted for the golf bag supports if it is so desired.

These and other objects and novel features of the present invention will be more clearly and fully set forth in the following specification and claims.

DESCRIPTION OF THE DRAWINGS

FIG. 4 is a side elevational view of the golf cart, partially sectioned to show the general arrangement of parts therein.

FIG. 5 is a front elevational view of the golf cart with the golf bag support in place thereupon.

FIG. 6 is a perspective detail showing the brake and throttle actuating mechanism.

FIG. 7 is a top plan view of the front section of the apparatus.

FIG. 8 is a vertical sectional view through one of the front wheels illustrating the manner in which they are supported.

FIG. 9 is an elevational detail and a vertical sectional view through a portion of the front portion of the device, the position of the section being indicated by the line 9—9 of FIG. 7.

FIG. 10 is a perspective view of the apparatus as used for mowing lawns and the like.

DESCRIPTION OF THE INVENTION

Figure 1:
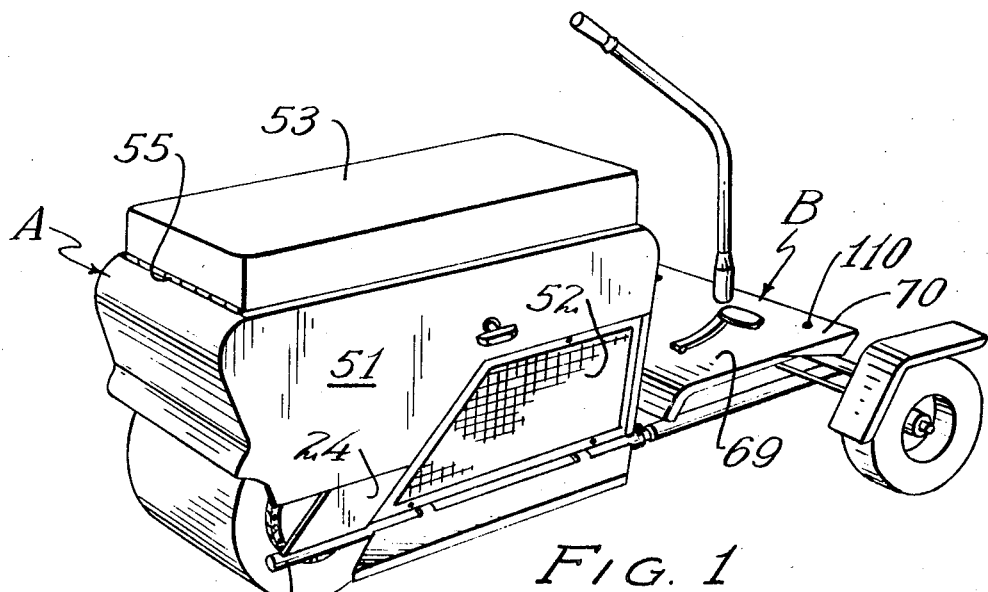
FIG. 1 is a perspective view of the golf cart with the golf bag supports removed therefrom.

The golf cart includes two main portions, the first of which is indicated by the letter A and comprises actually the body of the device, and a second portion of which is indicated by the letter B and comprises the forward portion thereof. As will be described, the two parts are merely secured in telescopic relation and accordingly may be detached by loosening the set screws or other fastening means and pulling the two parts apart.

The rear portion of the apparatus includes a pair of spaced parallel tubular frame members which are connected together in spaced relation by front and rear angle irons 11 and 12 which support a base plate 13. An internal combustion engine 14 is supported upon the plate 13 with its drive shaft 15 extending transversely of the body.

The frame of the apparatus also includes a tubular frame member 16 connected at its lower end 17 to a corresponding side frame member 10. The frame member 16 is bent as indicated at 19 to extend horizontally in parallel relation to the tubular member 10 as indicated at 20. The frame member is likewise bent at its rear end 21 to incline downwardly and inwardly as indicated at 22, and is then bent to extend forwardly as indicated at 23. Angularly extending side plates 24 connect the rear end of the frame member 10 to the horizontally extending portion 23 of the supporting frame. One such supporting frame including the parts 16, 20, 22 and 23 are provided on each side of the body, or attached to each frame member 10.

Inwardly extending ledges 25 are provided on each of the side plates 24, and the ledges 25 support bearings 26 in axial alignment. A wheel axle 27 is supported by the bearings 26 and the shaft 27 supports a wheel 29 including a very wide tread tire 30.

The sides of the frame are strengthened by a pair of generally diagonally extending braces 31 which extend from the cross member 12 to a rear cross brace 32 extending from one frame section 20 to the other. A similar cross member 33 connects the forward ends of the frame sides 20. The diagonal braces 31 include a lower upwardly extending portion 34, a rearwardly and upwardly inclined portion 35, and a terminal end portion 36 which is connected to the cross member 32. The purpose of this arrangement is to avoid interference with the rear wheel 30.

Opposed bearings 37 are supported on the upwardly and rearwardly inclined portions 35 of the braces 31 to support transverse shaft 39 supporting a large diameter sprocket 40 and a smaller diameter sprocket 41. A chain 42 connects the large diameter sprocket 40 with a sprocket 43 on the engine shaft 15. A chain 44 connects the small diameter sprocket 41 with a large diameter sprocket 45 on the axle 27. The sprocket 43 is not directly connected to the motor shaft 15, but is connected through centrifugal clutch and brake element 46 which is capable of permitting the engine 14 to function without driving the sprocket 43.

The rear portion or body portion of the cart includes a back panel 47 which encloses the rear of the body and follows the contour of the frame, except for the provision of a skirt 49 which extends rearwardly in spaced relation to the rear wheel 30. A front panel 50 closes the forward end of the body portion. Side panels such as 51 enclose the sides of the body portion. Removable screens 52 are provided on opposite sides of the engine 14 to provide the necessary air for combustion, and to permit the exhaust gases to escape.

The detail construction of the seat cushion 53 is not illustrated, as it forms no part of the present invention. It is believed sufficient to say that the cushion 53 is mounted upon a supporting panel 54 hingedly connected along its rear edge as indicated at 55 to the rear of the body. The cushion 53 may be swung upwardly beyond vertical position to gain access to the interior of the body.

Figure 2:
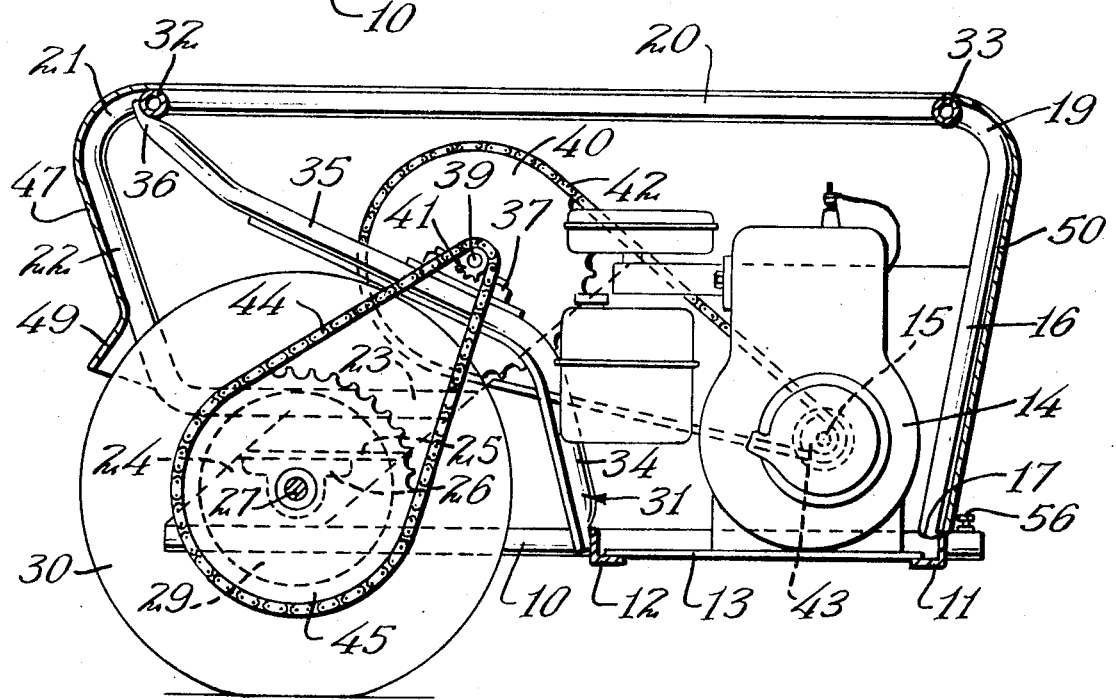
FIG. 2 is a vertical sectional view through the rear portion of the apparatus with the cushion removed therefrom.

As indicated in FIG. 2, the present structure includes set screws 56 extending into the forward ends of the tubular frame sides 10 to hold the rear portion of the device, which has been described, to the forward portion thereof. Obviously, pins or other connecting means may be used in place of the set screws if it were desired. The loosening of the set screws or the removal of the pins is all that is necessary to separate the rear portion of the cart from the forward portion thereof.

The front portion B of the apparatus is perhaps best illustrated in FIG. 7 of the drawings. As indicated, the front portion includes a pair of parallel tubular sides 60 having rods 61 projecting rearwardly from the ends thereof and designed to telescope into forward ends of the frame sides 10. As indicated in FIG. 4, a plate 62 underlies the forward ends of the frame sides 60 and connects the same. An angular member including a vertical flange 63 and a horizontal flange 64 spaced above the plate 62 extends across the front end of the front section. A pair of substantially horizontal frame members 65 overlie the flange 64 and are connected thereto. The rear ends of the frame member 65 incline downwardly as indicated at 66, and are attached to the frame sides 60. A tubular cross member 67 also extends between the frame sides 60 to hold them in parallel relation.

A platform plate 69 overlies the supports 65 and the inclined ends 66 thereof. The forward end of the platform 60 inclines somewhat upwardly as indicated at 70, and terminates in a downwardly and rearwardly inclined forward end portion 71 which is terminally attached to the plate 62. The platform thus provided encloses the forward end of the front section forms a foot rest for the front passenger of the cart.

A pair of front wheels 72 are supported by L-shaped axles 73 as best indicated in FIG. 8 of the drawings. The axles 73 include a vertical portion 74, and a horizontal portion 75 upon which the wheels 72 are mounted, a pin 76 or other retaining means being provided to hold the wheel in place. The vertical portion 74 of each axle 73 extends through a vertical journal 77 mounted on the outer end of a tubular arm 79. The inner end of each arm 79 is provided with a journal 80 (see FIG. 9) pivotally mounted on a pivot bolt 81. Each pivot bolt 81 extends through the flange 64, the plate 62, as well as through the corresponding journal 80. When in normal operative position, the arms are held in aligned relation as shown in full lines in FIG. 7 of the drawings. Each vertical end 74 of the axle 73 also extends through a plate 82, the outline shape of which is indicated in FIG. 7 of the drawings. The plates 82 each support a fender portion 83 which extends upwardly over a corresponding front wheel 72, and which inclines downwardly rearwardly of the wheel as indicated at 84.

A central pivot 85 is supported by the plate 62 and the flange 64 to extend upwardly therefrom. A sleeve 86 is pivotally supported on the upper end of the pivot 85, and is held in place by a retaining member 87. A plate 89 is welded or otherwise secured to the sleeve 86 to extend on a horizontal plane radially and rearwardly from the sleeve 86. A pair of tie rods 90 are provided with their outer ends pivotally connected by vertical pivot poles 91 to the plate 82. The inner ends of the tie rods 92 are connected by vertical pivot poles 92 to the plate 89. Accordingly, rotation of the sleeve 86 about the pivot pole 85 in either direction acts to pivot the front wheels 72 about the vertical shanks 74 of the axles 73. The tie rods 90 hold the wheels 72 substantially parallel.

A handle lever or tiller 93 is provided with a socket 94 on its lower end which is designed to accommodate the sleeve 86. The sleeve 86 is provided with a key 95 which is normally accommodated in a suitable key slot in the inner surface of the socket 94. The tiller 93 is curved or angled so that the handle end 96 normally extends toward the driver of the cart. By movement of the handle end 96 of the tiller in one direction or the other, the sleeve 86 may be pivoted in one way or another in order to steer the vehicle along a desired course.

The purpose of this arrangement is mainly to permit the front wheels 72, which must normally be spaced apart a considerable distance to provide a proper stability for the cart, to swing toward the opposite sides of the forward section of the device when the cart is being transported. In other words, the wheels 72 may be swung from the position indicated in full line sin FIG. 7 of the drawings to the position indicated in broken lines in the same figure. As a result, the width of the forward section may be materially reduced during transportation.

A pair of golf club bag supports 99 may be detachably connected to the forward section B, each capable of supporting a bag of golf clubs. Each of the bag supports 99 includes a standard 100 having a forwardly projecting right angular plate or ring 101 at its lower end upon which a golf bag may be supported. A pair of generally U-shaped brackets 102 and 103 are provided on each standard 100 designed to partially encircle a golf bag. The standards 99 are inclined rearwardly and outwardly as indicated in FIG. 5 so that the bags tend to remain in place without support.

If additional retaining means for holding the golf bags in place is desired, the ends of the U-shaped brackets 102 and 103 may be slotted as indicated at 104 to accommodate restraining straps for holding the golf clubs in place.

Figure 3:
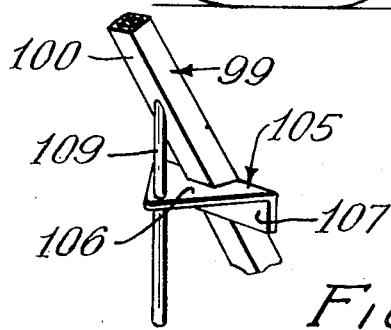
FIG. 3 is a perspective detail showing the lower end of one of the golf bag supports.

As is indicated in FIG. 3 of the drawings, each of the standards 100 is supported by means of an angle bracket 105 having a horizontal flange 106 which overlies the forward portion 70 of the platform 69, and a vertical flange 107 which extends along the front wall 71 of the platform. A pin 109 extends through the horizontal flange 106 and its upper end secured to the standard 100. The pin 109 is designed to extend through an aperture 110 (shown in FIG. 1) in the forward end portion 70 of the platform 69, and is designed to extend through an aligned aperture 111 in the plate 62 as indicated in FIG. 4. The pins 109 of the two golf bag supports 99 are designed to extend rearwardly of the arms 79 to hold the arms in alignment. In other words, the pins 109 of the golf bag supports 99 serve the double purpose of holding the golf bag supports in position, and also holding the wheel supporting arms 79 in alignment when the device is in use.

The purpose of the use of the golf bag supports to hold the front wheel supporting arms in aligned extended position is merely to simplify the task of assembling the cart once it has been taken apart for transportation. To assemble the cart, it is only necessary to telescope the sections A and B, attach the two by tightening the set screws 56 or inserting pins at these points, swinging the front wheel supporting arms 79 into alignment, and inserting the golf bag supports to lock the arms in place. When the cart is used for other purposes, any form of headed pin may be used in place of the pins 109.

FIGS. 4 and 6 of the drawings disclose the clutch and throttle control for the engine. In the interests of simplicity, the brake disc of the clutch 46 has been omitted in FIG. 6. However, the clutch is provided with a drum 112 about which extends a brake band 113 which is deadended at a pivot bolt 114. FIG. 6 of the drawings shows a pair of connected parallel levers 115 which are pivotally rotatable about the pivot bolt 114. The levers 115 are normally biased toward the position indicated in FIG. 6 by a spring 116 extending between the lower ends of the levers and an angle iron cross-member 11 extending between the frame sides 10 and the forward ends thereof. A push rod 119 is loosely attached to the lower ends of the levers 115 as indicated at 120, the connection being loose enough so that the levers may pivot to some extent relative to the push rod 119 which extends through an aperture 121 in the angle iron 11.

The movable end of the brake band 113 is hingedly connected to a pin 122 extending through apertures 123 at the upper ends of the levers 115. As a result, the brake band 113 is normally held in position to stop rotation of the brake drum 112 which in turn is connected in the manner described to the rear wheel of the vehicle. The spring 116 is sufficiently strong to bring the cart to a halt when the push rod 119 is not actuated.

As indicated in FIG. 4 of the drawings, a combination brake and accelerator pedal 124 is pivotally supported as indicated at 125 beneath the platform 69. The lower end of the bell crank lever which forms the pedal 124 is indicated at 126, which extends downwardly beneath the platform 69. The bell crank lever forming the pedal 124 is connected to a push rod 127 which is moved rearwardly as the pedal 124 is depressed. As indicated in FIG. 7 of the drawings, the rear end of the push rod 127 is provided with bearing plate 129 which engages the forward end of the push rod 119 when the two parts of the device are assembled. As a result, the depression of the pedal 124 acts to move the push rod 119 rearwardly, swinging the levers 115 in a counter clockwise direction as viewed in FIG. 6, and thereby loosening the brake band 113 about the drum 112.

A throttle wire 130 is connected to the push rod 119, and extends through an anchored flexible cable 131 to the throttle of the cart engine 14 to increase the speed of the engine as the pedal 124 is depressed. As a result, when the pedal is depressed, the brake band 113 is gradually released and the speed of the engine 14 is gradually increased so that the vehicle will start in motion. As soon as downward pressure on the throttle pedal is released, the brake band 113 is applied to stop movement of the vehicle, and the speed of the engine is simultaneously reduced.

As will be understood, the cart is of light enough weight so that it may be lifted into the trunk of an ordinary automobile. To disassemble the device, it is only necessary to loosen the two set screws 56 or to remove the fastening pins connecting the two parts. The handle lever or tiller 73 is merely lifted from the sleeve 86. The golf bag supports 99 are lifted out of place, permitting the wheels of the front section to swing together as shown in broken lines in FIG. 7 of the drawings. As a result, the apparatus may be conveniently moved to a golf course in the trunk of a car, and may be replaced in the trunk after the game. FIG. 10 of the drawings discloses the device used for mowing a lawn or the like. As indicated, the mower unit C is provided with a pair of parallel bars 135 which may be pivotally connected between spaced lugs 136 at the forward end of the front section B, the pivot poles 137 being axially aligned. This view is provided to indicate diagrammatically the manner in which the cart may serve other purposes beside that for which it was originally intended.

In accordance with the patent office statutes, I have described the principles of construction and operation of my improvement in golf cart and while I have endeavored to set forth the best embodiment thereof, I desire to have it understood that changes may be made within the scope of the following claims without departing from the spirit of my invention.

I claim:

1. A collapsible golf cart including:
a rear body section including
a housing enclosing a drive engine provided with a throttle,
wheel means supporting said body portion and connected to said drive engine,
a seat on said housing,
a detachable front section including a pair of steering wheels,
detachable means connecting said rear body portion and said detachable front section,
said front section including parallel motion means for supporting said steering wheels, said parallel motion means being supported on generally vertical pivots, said parallel motion means being movable between a position in which said parallel motion means is substantially aligned and said steering wheels are relatively far apart to a position in which said steering wheels are closely adjacent to said front section and relatively close together.

2. The structure of claim 1 and including openings in said front section and said parallel motion mechanism which are registrable when said parallel motion means is substantially aligned, and including removable means engageable in said openings to hold said steering wheels relatively widely spaced apart.

3. The structure of claim 2 and in which said parallel motion means include spaced arms, and said openings in said parallel motion mechanism is between said spaced arms.

4. The structure of claim 2 and in which said removable means engageable in said openings form parts of golf club supporting means.

5. The structure of claim 1 and including means on said body portion removably engageable with said parallel motion means to hold said steering wheels relatively widely spaced apart.

6. A collapsible golf cart including:
a rear body section including
a housing enclosing a drive engine provided with a throttle,
wheel means supporting said body portion and connected to said drive engine,
a seat on said housing,
a detachable front section including a pair of steering wheels,
means on said front section for steering said steering wheels,
detachable means connecting said rear body portion and said detachable front section,
said control means being connected to said engine through a combination brake and clutch normally biased toward braking position, and means for manually releasing said brake and simultaneously engaging said clutch to connect said engine to said drive wheel, said control means being also connected to the engine throttle to increase the engine speed as the brake is released means on said front section supporting said control means, and including automatically separable connecting elements between said section between said control means and said brake and clutch and said throttle.

7. A control mechanism for a golf cart of the type including a body having a front portion and a rear portion, a housing on the rear portion of said body enclosing a drive engine within said housing provided with a throttle, wheel means supporting said rear portion of said body and connected to said drive engine, a pair of steering wheels on opposite sides of said front portion of said body, and means on the rear portion of said body supporting said drive engine, said control mechanism including:
a combination brake and clutch assembly forming a part of the connection between said wheel means and said drive engine,
means normally biasing said assembly toward braking position and clutch released position and control means for manually releasing said brake and simultaneously engaging said clutch to connect said engine to said wheel means,
said control means being also connected to said engine throttle to increase the engine speed as said brake is released and said clutch engaged,
said forward portion and said rear portion of said body are separable, and including means on said front portion of said body supporting said control means, and including automatically separable connecting elements between said portions between said control means and said brake, clutch and throttle.

8. The structure of claim 7 and in which said front portion and rear portion of the body are telescopically connected, and said automatically separable connecting elements are separated by relative telescopic movement between said front and rear portions.

References Cited

UNITED STATES PATENTS

| | | | |
|---|---|---|---|
| 873,711 | 12/1907 | Bruen | 280—36 |
| 2,209,804 | 7/1940 | Ashley | 280—95 |
| 2,463,972 | 3/1949 | Jackson | 180—25 |
| 2,620,612 | 12/1952 | De Eugenio | 180—25 X |
| 2,705,156 | 3/1955 | Torre. | |
| 2,844,209 | 7/1958 | Brunderman. | |
| 2,919,758 | 1/1960 | Newton et al. | 180—25 |
| 3,043,389 | 7/1962 | Steinberg | 180—27 |
| 3,289,780 | 3/1965 | Ferris | 180—26 |
| 3,101,822 | 8/1963 | Clemens | 192—.094 X |
| 3,282,365 | 11/1966 | McReynolds | 280—402 X |
| 3,411,804 | 11/1968 | Hill et al. | 280—34 X |

KENNETH H. BETTS, Primary Examiner

U.S. Cl. X.R.

56—26; 280—95